(12) United States Patent
Zhou et al.

(10) Patent No.: US 11,600,005 B2
(45) Date of Patent: Mar. 7, 2023

(54) PRE-STATISTICS OF DATA FOR NODE OF DECISION TREE

(71) Applicant: MICROSOFT TECHNOLOGY LICENSING, LLC, Redmond, WA (US)

(72) Inventors: Hucheng Zhou, Redmond, WA (US); Cui Li, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 808 days.

(21) Appl. No.: 16/479,536

(22) PCT Filed: Jan. 16, 2018

(86) PCT No.: PCT/US2018/013748
§ 371 (c)(1),
(2) Date: Jul. 19, 2019

(87) PCT Pub. No.: WO2018/136369
PCT Pub. Date: Jul. 26, 2018

(65) Prior Publication Data
US 2019/0355124 A1    Nov. 21, 2019

(30) Foreign Application Priority Data
Jan. 20, 2017   (CN) .......................... 201710050188.4

(51) Int. Cl.
*G06T 7/162*    (2017.01)
*G06N 20/00*    (2019.01)
(Continued)

(52) U.S. Cl.
CPC .......... *G06T 7/162* (2017.01); *G06F 16/9027* (2019.01); *G06K 9/6282* (2013.01); *G06N 5/003* (2013.01); *G06N 20/00* (2019.01)

(58) Field of Classification Search
CPC ... G06T 7/162; G06F 16/9027; G06K 9/6282; G06N 5/003; G06N 20/00
See application file for complete search history.

(56) References Cited

U.S. PATENT DOCUMENTS 5,870,735 A   2/1999 Agrawal et al.
6,480,876 B2  11/2002 Rehg et al.
(Continued)

FOREIGN PATENT DOCUMENTS

| CN | 102331992 A | 1/2012 |
|----|-------------|--------|
| CN | 105630936 A | 6/2016 |
| WO | 2016004062 A1 | 1/2016 |

OTHER PUBLICATIONS

International Search Report and Written Opinion for PCT/US2018/013748 dated Apr. 4, 2018.
(Continued)

*Primary Examiner* — Quoc A Tran
(74) *Attorney, Agent, or Firm* — Barta, Jones & Foley, PLLC

(57) ABSTRACT

Embodiments of the subject matter described herein relate to generating a decision tree based on data pre-statistics. A plurality of data samples for a node of the decision tree are obtained, and the plurality of data samples have corresponding feature values with respect to a first feature. A target range is determined from a plurality of predefined numerical ranges so that the number of feature values falling into the target range is greater than a predetermined threshold number. Then, the remaining of the feature values other than the feature values falling into the target range are assigned to the respective numerical ranges, and the feature values falling into all the numerical ranges are counted based on the assignment of the remaining of the feature values, for allocation of the plurality of data samples to child nodes of
(Continued)

the node. Accordingly, the data processing efficiency is substantially improved.

20 Claims, 6 Drawing Sheets

(51) Int. Cl.
  *G06F 16/901* (2019.01)
  *G06K 9/62* (2022.01)
  *G06N 5/00* (2006.01)
  *G06F 17/00* (2019.01)

(56) References Cited

U.S. PATENT DOCUMENTS

| | | | |
|---|---|---|---|
| 6,553,366 | B1 | 4/2003 | Miller et al. |
| 7,007,035 | B2 | 2/2006 | Kamath et al. |
| 8,543,517 | B2 | 9/2013 | Shotton et al. |
| 8,954,981 | B2 | 2/2015 | Harris et al. |
| 8,996,436 | B1 | 3/2015 | Ren et al. |
| 2003/0212713 | A1 | 11/2003 | Campos et al. |
| 2003/0229641 | A1 | 12/2003 | Kamath et al. |
| 2007/0078849 | A1* | 4/2007 | Slothouber ......... G06F 16/9535 707/999.005 |
| 2007/0185896 | A1* | 8/2007 | Jagannath ............ G06K 9/6282 707/999.102 |
| 2008/0201340 | A1 | 8/2008 | Thonangi |
| 2011/0307423 | A1 | 12/2011 | Shotton et al. |
| 2012/0154373 | A1 | 6/2012 | Finocchio et al. |
| 2014/0122381 | A1 | 5/2014 | Nowozin |
| 2014/0214736 | A1* | 7/2014 | Kimmel ................. G06N 20/00 706/12 |

OTHER PUBLICATIONS

"First Office Action and Search Report Issued in Chinese Patent Application No. 201710050188.4", dated Aug. 3, 2021, 15 Pages.
"Decision Trees—RDD-Based API", Retrieved from https://spark.apache.org/docs/2.2.0/mllib-decision-tree.html, Retrieved on Dec. 11, 2019, 7 Pages.
"Discounted Cumulative Gain", Retrieved from https://en.wikipedia.org/wiki/Discounted_cumulative_gain#Normalized_DCG, Retrieved on Dec. 11, 2019, 4 Pages.
"Light Gradient Boosting Machine", Retrieved from https://github.com/Microsoft/LightGBM, Jan. 1, 2016, 4 Pages.
Amado, et al., "Parallel Implementation of Decision Tree Learning Algorithms", In Proceedings of Portuguese Conference on Artificial Intelligence, Dec. 17, 2001, pp. 6-13.
Ben-Haim, et al., "A Streaming Parallel Decision Tree Algorithm", In Journal of Machine Learning Research 11, Feb. 1, 2010, pp. 849-872.
Blei, et al., "Latent Dirichlet Allocation", In Journal of Machine Learning Research, Jan. 1, 2003, pp. 993-1022.
Bohanec, et al., "Trading Accuracy for Simplicity in Decision Trees", In Journal of Machine Learning, vol. 15, Issue 3, Jun. 1994, pp. 223-250.
Breiman, Leo, "Bagging Predictors", In Journal of Machine Learning, vol. 24, Issue 2, Aug. 1996, pp. 123-140.
Breiman, et al., "Classification and Regression Trees", Published by CRC Press, Jan. 1, 1984, 2 Pages.
Breiman, Leo, "Random Forests", In Journal of Machine Learning, vol. 45, Issue 1, Oct. 2001, pp. 5-32.
Burges, Christopher J.C., "From Ranknet to Lambdarank to Lambdamart: An Overview", In Microsoft Research Technical Report MSR-TR-2010-82, Jun. 23, 2010, 19 Pages.
Burges, et al., "Learning to Rank with Nonsmooth Cost Functions", In Proceedings of Advances in Neural Information Processing Systems, Dec. 4, 2006, 8 Pages.
Chapelle, et al., "Yahoo! Learning to Rank Challenge Overview", In Proceedings of the Yahoo! Learning to Rank Challenge, vol. 14, Jun. 25, 2010, 24 Pages.
Chen, et al., "XGBoost: A Scalable Tree Boosting System", In Journal of the Computing Research Repository, Mar. 9, 2016, 13 Pages.
Chickering, et al., "Efficient Determination of Dynamic Split Points in a Decision Tree", In Proceedings of the IEEE International Conference on Data Min, Nov. 29, 2001, 8 Pages.
Freitas, et al., "Mining Very Large Databases with Parallel Processing", Published by Kluwer Academic Publishers, Nov. 30, 1997, 5 Pages.
Friedman, Jerome H., "Greedy Function Approximation: A Gradient Boosting Machine", In Journal of Annals of Statistics, vol. 29, Issue 5, Oct. 1, 2001, pp. 1189-1232.
Gulin, et al., "Greedy Function Optimization in Learning to Rank", Retrieved from http://romip.ru/russir2009/slides/yandex/lecture.pdf, Sep. 2009, 33 Pages.
Huang, et al., "Learning Deep Structured Semantic Models for Web Search using Clickthrough Data", In the Proceedings of the 22nd ACM International Conference on Information & Knowledge Management, Oct. 27, 2013, pp. 2333-2338.
Kearns, et al., "A Fast, Bottom-Up Decision Tree Pruning Algorithm with Near-Optimal Generalization", In Proceedings of the 15th International Conference on Machine Learning, Feb. 27, 1998, 16 Pages.
McMahan, et al., "Ad Click Prediction: A View from the Trenches", In Proceedings of the 19th ACM SIGKDD International Conference on Knowledge Discovery and Data Mining, Aug. 11, 2013, 9 Pages.
Mehta, et al., "SLIQ: A Fast Scalable Classifier for Data Mining", In Proceedings of the 5th International Conference on Extending Database Technology: Advances in Database Technology, Mar. 25, 1996, 15 Pages.
Mikolov, et al., "Distributed Representations of Words and Phrases and their Compositionality", In Proceedings of 27th Annual Conference on Neural Information Processing Systems, Dec. 5, 2013, 9 Pages.
Panda, et al., "PLANET: Massively Parallel Learning of Tree Ensembles with MapReduce", In Journal Proceedings of the Very Large Data Bases Endowment, vol. 2, Issue 2, Aug. 24, 2009, pp. 1426-1437.
Patil, et al., "Evaluation of Decision Tree Pruning Algorithms for Complexity and Classification Accuracy", In International Journal of Computer Applications, vol. 11, No. 2, Dec. 2010, pp. 23-30.
Provost, et al., "A Survey of Methods for Scaling Up Inductive Algorithms", In Journal of Data Mining and Knowledge Discovery, vol. 3, Issue 2, Jun. 1, 1999, 42 Pages.
Quinlan, et al., "C4.5: Programs for Machine Learning", In Journal of Machine Learning, vol. 16, Issue 3, Sep. 1994, pp. 235-240.
Quinlan, J. R., "Induction of Decision Trees", In Journal of Machine Learning, vol. 1, Issue 1, Mar. 1, 1986, pp. 81-106.
Rokach, et al., "Data Mining with Decision Trees: Theroy and Applications", Published by World Scientific Publishing, 2008, 2 Pages.
Schamoni, et al., "Ranking with Boosted Decision Trees", Retrieved from http://www.ccs.neu.edu/home/vip/teach/MLcourse/4_boosting/materials/Schamoni_boosteddecisiontrees.pdf, Jan. 16, 2012, 51 Pages.
Schapire, et al., "Boosting: Foundations and Algorithms", Published by MIT Press, 2012, 3 Pages.
Shafer, et al., "SPRINT: A Scalable Parallel Classifier for Data Mining", In Proceedings of the 22th International Conference on Very Large Data Bases, Sep. 3, 1996, 12 Pages.
Srivastava, et al., "Parallel Formulations of Decision-Tree Classification Algorithms", In Journal of Data Mining and Knowledge Discovery, vol. 3, Issue 3, Sep. 1999, 24 Pages.
Zheng, et al., "A General Boosting Method and Its Application to Learning Ranking Functions for Web Search Neur", In Proceedings of the 20th International Conference on Neural Information Processing Systems, Dec. 3, 2007, 8 Pages.
Tyree, et al., "Parallel Boosted Regression Trees for Web Search Ranking", In Proceedings of the 20th International Conference on World Wide Web, Mar. 28, 2011, 10 Pages.

(56) References Cited

OTHER PUBLICATIONS

He, et al., "Practical Lessons from Predicting Clicks on Ads at Facebook", In Proceedings of the 8th International Workshop on Data Mining for Online Advertising, Aug. 24, 2014, 9 Pages.

Ye, et al., "Stochastic Gradient Boosted Distributed Decision Trees", In Proceedings of the 18th ACM Conference on Information and Knowledge Management, Nov. 2, 2009, pp. 2061-2064.

Zaharia, et al., "Resilient Distributed Datasets: A Fault-Tolerant Abstraction for In-Memory Cluster Computing", In Proceedings of the 9th USENIX Conference on Networked Systems Design and Implementation, Apr. 25, 2012, 14 Pages.

Zeiler, Matthew D., "Adadelta: An Adaptive Learning Rate Method", In Journal of Computing Research Repository, Dec. 2012, 6 Pages.

"Second Office Action and Search Report Issued in Chinese Patent Application No. 201710050188.4", dated May 13, 2022, 12 Pages.

Gurung, et al., "Learning Decision Trees From Histogram Data", In Proceedings of the 11th International Conference an Data Mining, Jul. 27, 2015, pp. 139-145.

Wei, et al., "Method of VoIP Traffic Identification based on C4.5 Decision Tree", In Jouranl of Application Research of Computers, vol. 29, Issue 9, Sep. 2012, 4 Pages.

"Office Action Issued in Chinese Patent Application No. 201710050188. 4", dated Aug. 3, 2022, 8 Pages.

\* cited by examiner

PRE-STATISTICS OF DATA FOR NODE OF DECISION TREE

CROSS-REFERENCE TO RELATED APPLICATION

This application is a U.S. National Stage Application of PCT/US2018/013748, filed Jan. 16, 2018, which claims benefit of Chinese Patent Application No. 201710050188.4, filed Jan. 20, 2017, which applications are hereby incorporated by reference. To the extent appropriate, a claim of priority is made to each of the above disclosed applications.

BACKGROUND

A decision tree is one technology widely used in a machine learning model or process. With this technology, non-linear correlation between data may be modeled and an interpretable result may be achieved, without extra feature preprocessing such as normalization. When combined with different loss functions, the decision tree may be used across a wide variety of fields of classification, regression, ranking, and the like. Furthermore, when the decision tree is combined with different ensemble technologies such as bagging and boosting, various decision tree algorithms may be derived, which include, for example, Random Forest, Gradient Boosting Decision Tree (GBDT), and the like. As an example, in combination with the different loss functions and ensemble technologies, the decision tree has been widely used in the following network (for example, Web) applications: document ranking in web searching, click prediction of an advertisement target, and the like.

In the decision tree algorithms, a single tree is fitted by recursively splitting nodes starting from a root. A conventional process of generating a decision tree requires considerable accesses to training data, and such frequent accesses will inevitably introduce a very large processing delay and substantially reduces a processing efficiency.

SUMMARY

Embodiments of the subject matter described herein provide a data processing mechanism of data processing in basis of a decision tree. The mechanism performs pre-statistics of feature values of data samples for a node to find out a numerical range into which more feature values fall. By virtue of the pre-statistics, only a small part of data samples needs to be accessed when the data samples are allocated to child nodes of the node.

In some embodiments, a plurality of data samples for a node of a decision tree are obtained, and the plurality of data samples have corresponding feature values with respect to a certain feature. Then, a target range is determined from a plurality of predefined numerical ranges, so that the number of feature values falling into the target range is greater than a predetermined threshold number. Accordingly, by assigning only the remaining of the feature values other than the feature values falling into the target range to the respective numerical ranges, the feature values falling into all the numerical ranges are counted for allocation of the plurality of data samples to child nodes of the node. In this way, a speed and efficiency of data processing may be substantially improved, and a speed and efficiency of generating the decision tree may be improved This Summary is provided to introduce selection of concepts in a simplified form. This Summary is not intended to identify key features or essential features of the claimed subject matter, nor is it intended to be used as an aid in determining the scope of the claimed subject matter.

BRIEF DESCRIPTION OF THE DRAWINGS

In conjunction with the accompanying drawings and with reference to the following detailed description, the above and other features, advantages, and aspects of embodiments of the subject matter described herein will become more apparent. In the figures, same or similar reference numbers represent same or similar elements, wherein.

Throughout the figures, same or similar reference numbers represent same or similar elements.

DETAILED DESCRIPTION

Figure 1:
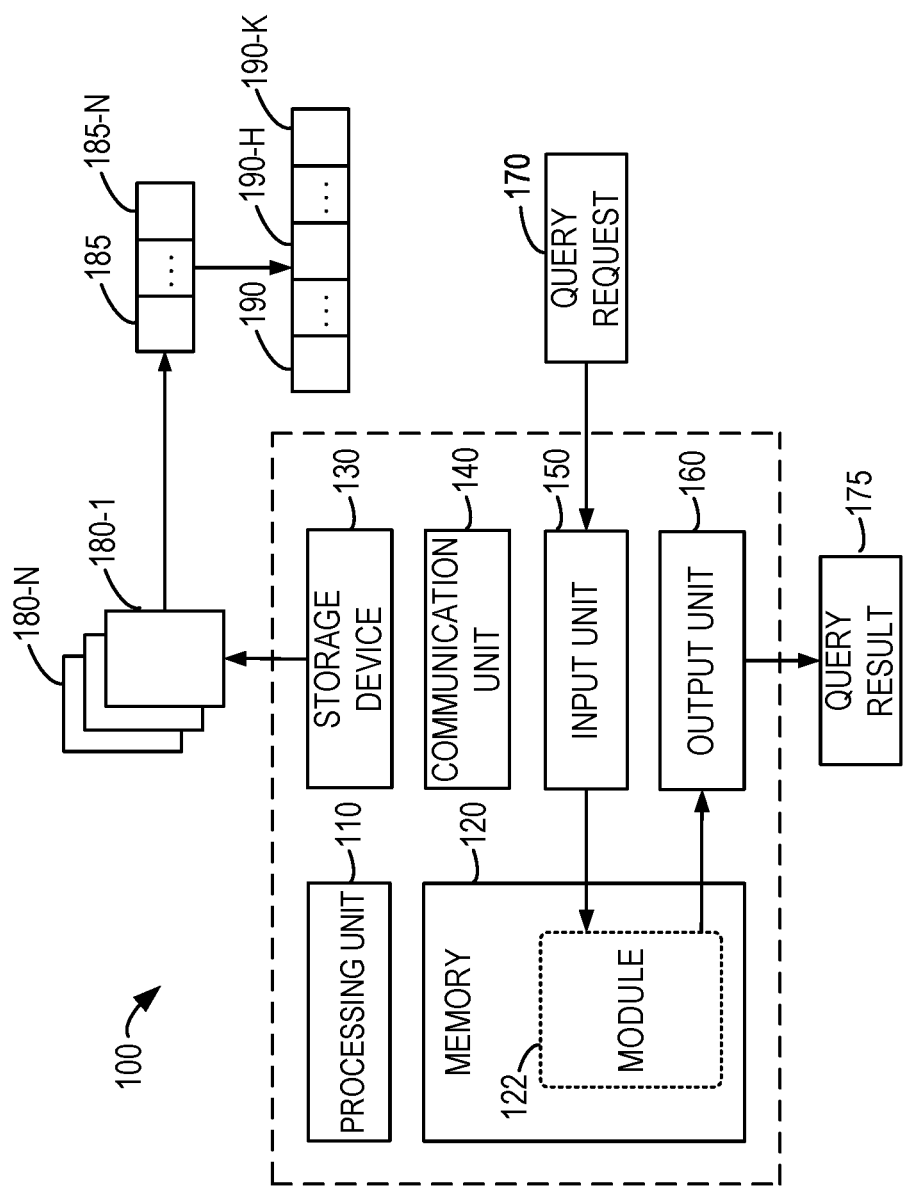
FIG. 1 illustrates a block diagram of a computing environment in which a plurality of embodiments of the subject matter described herein may be implemented.

Hereinafter, embodiments of the subject matter described herein will be described in more details with reference to the accompanying drawings. Although some embodiments of the subject matter described herein are illustrated in the drawings, it is to be understood that the subject matter described herein may be implemented through various forms, and may not be interpreted as being limited to the embodiments illustrated herein. On the contrary, these embodiments are provided only for more thorough and complete understanding of the subject matter described herein. It is to be understood that the accompanying drawings and embodiments of the subject matter described herein are only for the purpose of illustration, without suggesting any limitation to a protection scope of the subject matter described herein.

As used herein, the phrase "data sample" refers to data for training a learning model (or procedure). Examples of a data sample include, but are not limited to, documents in network (for example, Web) search ranking, advertisements in advertisement click prediction, and the like.

As used herein, the term "feature" refers to base information of generating a decision tree. A node in the decision tree may be split into child nodes based on this information. As an example, in the application of web search ranking, features may include, but be not limited to, the following three categories: 1) features modeling a query, for example including the number of items included in the query, an item frequency and an inverse document frequency value of each item, different types of item embeddings, expanded queries, query segments, and the like; 2) features modeling a web document, for example including a webpage ranking value, different numbers of anchor documents, language/region identifications of documents, document classification and the like; 3) features modeling relevance of the query and the document, which describes matching of the query and the document, for example including frequencies of each query item occurring in titles of documents and in an anchor document, embedding similarity between the query and the document, and the like. In the application of the advertisement click prediction, the features may include, but be not limited to, user profile (for example, an age, a gender, shopping preferences, and the like of a user), contents to be queried by the searching, query contexts (for example, a date, time, a position, a browser, an equipment, and the like), an advertisement content, matching similarity (of both syntax and semantics) between the query and the advertisement, and the like.

As used herein, the phrase "feature value" refers to a value indicating relevance between a data sample and a feature. The feature value may be any suitable value, including a continuous or discrete value. The feature value may be manually determined by related professionals.

As used herein, the phrase "training process" or "learning process" refers to a process of optimizing system performance using experiences or data. For example, during the Web search ranking, accuracy of the ranking is gradually optimized through the training or learning process. In the context of the subject matter described herein, for the purpose of discussion, the term "training" or "learning" may be used interchangeably.

As used herein, the term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As described above, the decision tree has been widely used in a machine learning model or process. For example, in the application of the web search ranking, given an input user query, a decision tree-based machine learning model may be used to predict relevance of document candidates, and further the document candidates may be sorted according to the predicted relevance. In the application of the advertisement click prediction, the decision tree may be used to predict possibility of clicking the advertisement by the user.

As described above, the conventional process of generating the decision tree requires the considerable accesses to training data. For example, when each node of the tree is split, all training data needs to be traversed to find out a best split from all split candidates. This will inevitably introduce the large processing delay and substantially reduce the processing efficiency. In particular, in a learning process of the web application, large-scale data is available at present. The data may consist of hundreds of millions of data samples, and each data sample may have thousands of features. Furthermore, the web application may use a large-scale learning model where thousands of trees may be integrated and hundreds of leaf nodes may be generated for each tree. Such large-scale data and model undoubtedly may further increase the processing delay and reduce the processing efficiency.

A conventional machine learning model for the web application allows the generation of the decision tree in a sample-parallel mode. For example, data samples residing on a single node of the tree may be grouped into a plurality of data sections. The individual data sections are processed in a parallel mode to determine respective local best splits, and then all the local best splits are combined together to determine a global best slit. Such sample-parallel processing approach may enable effective expansion of the samples so that a lot of data samples may be used in the learning process. However, when the conventional model is used to process each data section to determine the local best split, there is still a need for traversing the whole data section, and therefore the very large processing delay is still caused.

In order to at least in part solve the above problem and other potential problems, embodiments of the subject matter described herein presents an efficient method of data processing based on a decision tree. Generally, a plurality of data samples are first obtained for a node of the decision tree, and these data samples have corresponding feature values with respect to a certain feature (referred to as a "first feature"). Then, a target range is determined from a plurality of predefined numerical ranges, so that the number of features values falling into the target range is greater than a predetermined threshold number (referred to as a "first threshold number"). The remaining of the feature values other than the feature values falling into the target range are assigned to these predetermined numerical ranges, and thereby feature values falling into all the numerical ranges are counted for allocation of these data samples to child nodes of the node.

In order to facilitate understanding of the principles and concepts of the subject matter described herein, an example of the web search ranking is first considered. Of course, it is to be understood that the example described here is only for the purpose of understanding and illustration, without suggesting any limitation to the scope of the subject matter described herein in any mode.

In this example, a set of documents (that is, data sample documents) having attributes may be obtained, for example, in response to a search query. The attributes of documents include, for example, an author, creation time, a frequency of each queried item in the document, and the like. These attributes may be referred to as "features". The obtained documents have corresponding attribute values (that is, feature value) with respect to each attribute, to indicate relevance of the documents with respect to the attribute. During processing of these documents to generate the decision tree, for a node of the decision tree, a plurality of documents residing on the node may be obtained, and a target range from a plurality of predefined numerical ranges is determined into which more relevance values of these documents (for example, with the number of relevance values greater than the first threshold number) fall. Then, the remaining of the feature values other than the feature values falling into the target range are assigned to the respective numerical ranges, and on this basis, the feature values falling into the respective numerical ranges are counted for subsequent allocation of these documents to at least one child node of the node.

According to embodiments of the subject matter described herein, the target range, into which more feature values fall, may be found out based on the pre-statistics of the feature values of the data samples, and therefore the counting of the features values in all the numerical ranges may be implemented by performing only the allocation of the remaining of the feature values to the respective numerical ranges. This approach substantially reduces the number of accesses to the data samples, and thereby greatly saves processing time and improves a processing speed and efficiency.

Basic principles and several example implementations of the subject matter described herein will be illustrated below with reference to the drawings. FIG. 1 illustrates a block diagram of a computing device 100 in which a plurality of embodiments of the subject matter described herein may be implemented. It is to be understood that the computing device 100 shown in FIG. 1 is only for the purpose of illustration, without suggesting any limitation to a function and scope of implementations of the subject matter described herein in anyway. As shown, the computing device 100 may be implemented in form of a general purpose computing device. Components of the computing device 100 may include, but be not limited to, one or more processors or processing units 110, a memory 120, a storage device 130, one or more communication units 140, one or more input devices 150, and one or more output devices 160.

In some implementations, the computing device 100 may be implemented as various user terminals or service terminals. The service terminals may be servers, mainframe computing devices, and the like provided by various service providers. The user terminal may be any type of mobile terminals, multimedia computers, multimedia tablets, Internet nodes, communicators, desktop computers, laptop computers, notebook computers, netbook computers, tablet computers, personal communication system (PCS) devices, personal navigation devices, personal digital assistants (PDAs), audio/video players, digital camera/video cameras, positioning devices, TV receivers, radio broadcast receivers, E-book devices, gaming devices, or any combinations thereof, including accessories and peripherals of these devices or any combinations thereof. It may be foreseen that the computing device 100 may allow any type of interface to a user (such as a "wearable" circuit).

The processing unit 110 may be a physical or virtual processor and may perform various processing based on the programs stored in the memory 120. In a multi-processor system, multiple processing units execute computer-executable instructions in parallel to improve capability of the parallel processing of the computing device 100. The processing unit 110 may also be referred to as a central processing unit (CPU), a microprocessor, a controller, or a micro-controller.

The computing device 100 typically includes a plurality of computer storage media. Such media may be any available media accessible by the computing device 100, including, but not limited to, volatile and non-volatile media, and removable and non-removable media. The memory 120 may be a volatile memory (for example, a register, a cache, a Random Access Memory (RAM)), a non-volatile memory (for example, a Read-Only Memory (ROM), an Electrically Erasable Programmable Read-Only Memory (EEPROM), a flash memory), or any combination thereof. The memory 120 may include one or more program modules 122 which are configured to perform functions of various implementations as described herein. The modules 122 may be accessed and operated by the processing unit 110 to implement corresponding functions.

The storage device 130 may be any removable or non-removable media and include machine-readable media, which may be used for storing information and/or data and be accessed within the computing device 100. In particular, a set of data samples and the feature values of the data samples with respect to one or more features are stored in the storage device 130, and these data samples and feature values may be accessed by the processing unit 110.

The communication unit 140 communicates with a further computing device via communication media. In addition, the functions of the components in the computing device 100 may be implemented by a single computing cluster or a plurality of computing machines communicating via communication connections. Therefore, the computing device 100 may operate in a networking environment using a logical link with one or more further servers, personal computers (PCs) or a further general network node. When needed, the computing device 100 may also communicate via the communication unit 140 with one or more peripherals (not shown) such as a storage device, a display device and the like, with one or more devices that enable users to interact with the computing device 100, or with any device that enables the computing device 100 to communicate with one or more further computing devices (for example, a network card, a modem, and the like). Such communications may be performed via an input/output (I/O) interface (not shown).

The input device 150 may include one or more input devices, such as a mouse, a keyboard, a tracking ball, a voice-input device, and the like. As an example, as shown, a query request 170 may be input through the input device 150. The output device 160 may include one or more output devices, such as a display, a loudspeaker, a printer and the like. A query result 175 for the query request 170 may be output by the output device 160.

In some implementations, the input query request 170 may be further processed in the computing device 100. For example, a set of data samples may be obtained from the storage device 130 based on the query request 170. Based on the processing of the set of data samples, the module 122 may generate a decision tree. For example, when one node of the decision tree is split, the module 122 may obtain a plurality of data samples 180-1 to 180-N (collectively referred to as "data samples 180") residing on the node, and these data samples have corresponding feature values 185-1 to 185-N (collectively referred to as "feature values 185") with respect to a certain feature. The module 122 may count the feature values 185 falling into a plurality of predefined numerical ranges 190-1 to 190-K (collectively referred to as "numerical ranges 190"). In some implementations, the module 122 may allocate the data samples to child nodes of the node based on the counting. In some implementations, the module 122 may generate the query result 175 based on the generated decision tree and provide the query result 175 to the output unit 160 for output.

In a conventional approach of generating the decision tree, a binary tree may be constructed by regressively splitting node candidates from a root node until the number of leaf nodes or depth of the tree reaches a predetermine limit. As far as a single node is concerned, the splitting process may include the following two steps: (1) finding a best split, and (2) implementing the splitting. First, in the step of finding the best split, based on the processing of the data samples of the node, all possible threshold feature values of all features for implementing the splitting are listed, and then the best split is found. For example, the best feature and the best threshold feature value of the feature are found so that when the data samples are allocated to the respective child nodes according to the feature and the threshold feature value, a difference between the data samples reaching the different child nodes is largest. Then, in the step of implementing the splitting, the data samples are allocated to a left child node or a right child node.

A specific example will be described below in conjunction with the search query. In this example, a set of documents (that is, data sample documents) having attributes may also be obtained, for example, in response to the search query.

The attributes of documents include, for example, authors, creation time, a frequency of each queried item in the documents, and the like. These attributes may be referred to as "features". The obtained documents have corresponding attribute values (that is, feature values) with respect to each attribute to indicate relevance of the documents with respect to the attribute.

In the step of finding the best split, the data sample documents may be first divided into document subsets based on all possible attribute values of all attributes. Then, a best attribute value for a certain attribute may be found so that the difference of the resulting document subsets is largest, that is, the documents are distinguished with the largest possibility. Then, results of dividing the data sample documents based on the respective best attribute values of all attributes are compared to find the best attribute causing the most difference of the document subsets. In the step of implementing the splitting, the data sample documents may be divided into subsets of documents according to the best attribute and the corresponding best attribute value.

Conventionally, in the step of finding the best split, for each feature, the allocation of the samples to the child nodes is determined based on the feature values of the data samples and the corresponding threshold feature value, and statistical data of each possible splitting is calculated, so that the best split may be found out. A conventional approach of calculating the statistical data first assigns all continuous feature values of the data samples with respect to a feature to a plurality of discrete numerical ranges. The numerical ranges may also be referred to as "bins". After the statistical data of each bin is obtained, the statistical data of all the bins is aggregated to obtain total statistical data, such as a histogram. The statistical data may reflect, for example, a count of the feature values, a target decision tree for the feature, and the like. Thus, a histogram may be obtained for each feature, and thereby the best split may be found based on the histograms of all the features.

However, the above process of assigning all continuous feature values to the discrete bins needs frequent accesses to all the data samples, so it is very time-consuming. In particular, in the case of the massive number of samples and/or features, this assigning process consumes a lot of time and substantially reduces the speed of generating the decision tree.

Inventors note that the feature values of the data samples are typically distributed unevenly among the numerical ranges. For example, there will be a certain numerical range into which a larger number of feature values fall. Such uneven distribution may come from intrinsic data sparsity, and this sparsity may be caused, for example, by the following factors: missing feature values, frequent zero entries in statistics, one-hot coding, specific binning algorithms, and the like.

Therefore, according to embodiments of the subject matter described herein, a target range 190-H is determined from a plurality of predefined numerical ranges 190, so that the number of feature values 185 falling into the target range 190-H is greater than the first threshold number. The assignment of these feature values falling into the target range 190-H is not required, and only the remaining of the feature values need to be assigned to the respective numerical ranges. The features values falling into all the numerical ranges may be counted according to the assignment of the remaining of the feature values. Further, based on the counting and other statistics of these numerical ranges, the data samples 180 may be allocated to child nodes of the node. In this way, the processing time may be saved, and the speed and efficiency of allocating the data samples to the respective child nodes may be improved. The process of allocating the data samples from the node to the child nodes may also be referred to as "node splitting".

Figure 2:
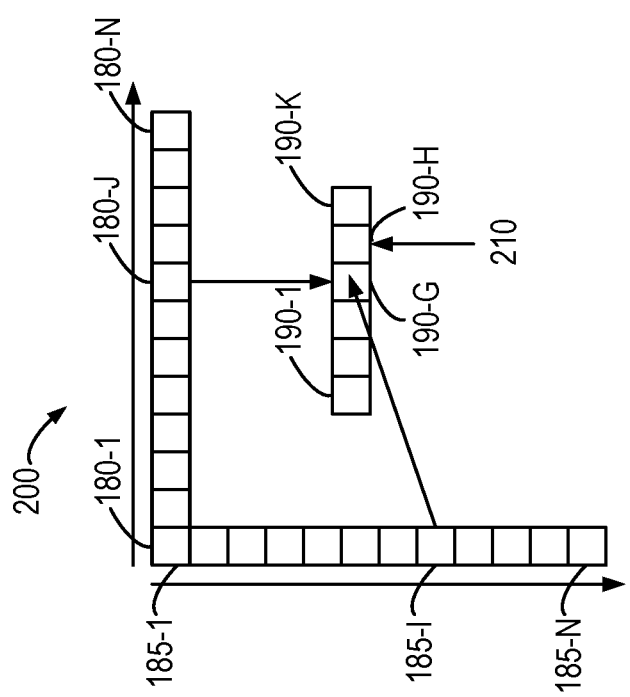
FIG. 2 illustrates an example process of splitting a node of a tree according to some embodiments of the subject matter described herein.

FIG. 2 illustrates an example process 200 of splitting nodes of a tree according to some embodiments of the subject matter described herein. As shown, a plurality of data samples 180 (for example, the data samples 180-1 to 180-N) for a node of the decision tree are obtained, and these data samples 180 have corresponding feature values 185 (for example, the feature values 185-1 to 185-N) with respect to a feature. According to embodiments of the subject matter described herein, the plurality of data samples 180 may be selected in any suitable approach from the set of data samples for the node. For example, the data samples 180 may be a full set or subset of data samples for the node. Specific embodiments in this regard will be described in detail in the following paragraphs.

FIG. 2 also shows a plurality of predefined numerical ranges 190 (for example, the numerical ranges 190-1 to 190-K). According to embodiments of the subject matter described herein, the target range 190-H is determined from these numerical ranges 190, into which the number of feature values falling is greater than the first threshold number. The determination of the target range 190-H may be implemented by means of any suitable pre-statistics of the distribution of the feature values. In an embodiment in which the feature values 185 are continuous values, statistics of the distribution of the feature values may be directly performed to find a numerical interval in which more feature values are located. Any statistics approach in the art already known or to be developed in the future may be used here. The target range 190-H in which the number of the feature values is greater than the first threshold number may be found by matching the numerical interval with the predefined numerical ranges. As an example, the first threshold number may be determined based on the numbers of feature values falling into the respective numerical ranges so that the determined target range 190-H has the most feature values.

In some embodiments, in order to further save a processing time and a storage space, the feature value 185 may be a pre-processed (for example, discretized) value rather than an original value. For example, an original feature value (for example, a continuous value) of each data sample may be replaced in advance with an identifier (ID) of the corresponding numerical range 190 into which it falls. Accordingly, the statistics may be performed on the distribution of the individual feature values over the respective numerical ranges 190, and the target range 190-H having more or the most feature values may be found from these ranges.

After the target range 190-H is determined, the remaining of the feature values other than the feature values falling into the target range 190-H are assigned to the respective numerical ranges. For example, as shown in FIG. 2, for the data sample 180-J, a corresponding feature value 185-1 is found and assigned to the corresponding numerical range 190-G. The assignment of the feature values to the numerical ranges may be implemented in any suitable approach. In some embodiments, the features values may be stored in storage areas allocated to the respective numerical ranges. In this case, because the feature values falling into the target range 190-H do not need be stored, the processing time is saved, and meanwhile the storage space is substantially saved.

In an embodiment in which the feature values are pre-processed (for example, discretized), the feature values falling into the remaining of the numerical ranges other than the target range may be replaced with the IDs of the corresponding numerical ranges, and thereby these feature values may be discretized while being assigned to the numerical ranges. The feature values falling into the target range may be directly replaced with the ID of the target range to further improve the processing efficiency.

After completing the assignment of the feature values (for example, the feature value 185-I) except for the feature values falling into the target range 190-H to the respective numerical ranges (for example, the numerical range 190-G), the feature values falling into all the numerical ranges are counted for subsequent allocation of the data samples 180 to the child nodes of the node. According to embodiments of the subject matter described herein, the counting may be implemented in any suitable approach. As an example, for a numerical range except for the target range 190-H, the feature values assigned to the numerical range may be counted directly. For the target range 190-H, the corresponding count 210 may be calculated as a difference value of subtracting the total number of feature values falling into the remaining numerical ranges from the total number of the plurality of data samples 180. Thus, the speed of processing the data samples is substantially increased.

In addition to the numbers of feature values included in the numerical ranges, in some embodiments, other statistical data related to the individual numerical ranges, such as the target decision tree for the feature, may be obtained. As an example, it is considered that the node is split based on statistical data (for example, a histogram) of the data samples in the individual bins as described above. In this example, the total statistical data of the data samples with respect to the feature is additive summation of the corresponding statistical data of all the data samples. The total statistical data of the current node may be inherited from its parent node. In this case, the statistical data of the target range may be obtained by subtracting the statistical data of the remaining numerical ranges other than the target range from the total statistical data. The approach of obtaining the corresponding histograms (that is, the statistical data) based on the feature values assigned to the individual bins and splitting the node based on the statistical data is already known in the art and therefore not detailed any more here.

In this way, when the node is split, only the remaining of the feature values other than the feature values falling into the target range 190-H need to be assigned to the respective numerical ranges. Thus, the processing speed is substantially increased, and the speed of splitting the node is accordingly increased.

As described above, the data sample 180 may be a full set or subset of the data samples for the node. By way of example, in order to increase the speed of generating the decision tree, in some embodiments, the data processing based on the decision tree may be performed in distribution on a plurality of machines. The machines may be physical machines such as physical computing devices, or virtual machines for example on one or more physical computing devices. In this case, these machines may perform the data processing related to the generation of the decision tree in distribution and in parallel. The distributed processing may be implemented in any suitable parallel mode. As an example, the distributed processing may be executed in a sample-parallel, a feature-parallel or a task-parallel mode. In an embodiment where the sample-parallel mode is employed, each machine may select a subset from the set of data samples for the node and process the corresponding feature values of the subset of data samples with respect to all features available for the node splitting. A specific example is described below with reference to FIG. 3.

Figure 3:
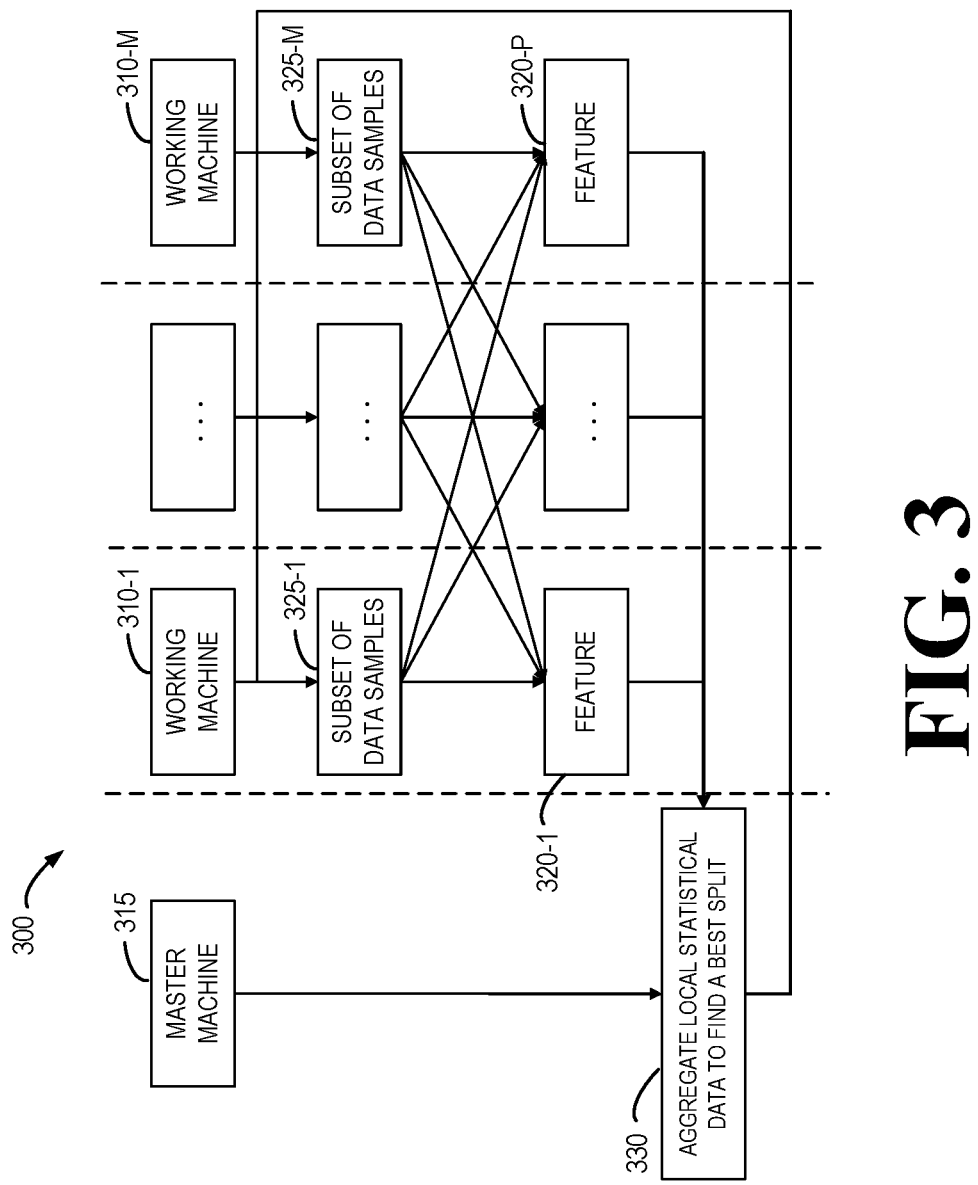
FIG. 3 illustrates an example flow of splitting a node in a sample-parallel mode by a plurality of machines in a system according to some embodiments of the subject matter described herein.

FIG. 3 illustrates an example flow of splitting a node in a sample-parallel mode by a plurality of machines in a system 300 according to some embodiments of the subject matter described herein. As shown, the system 300 includes a plurality of working machines 310-1 to 310-M (collectively referred to as "working machines 310") and a master machine 315. It is to be understood that the system 300 may include any suitable number of working machines and master machines that may split the node in coordination.

In this example, a set of features including a plurality of features 320-1 to 320-P (collectively referred to as "features 320") may be used to implement the node splitting. Each working machine 310 may select a subset of data samples 325-1 to 325-M (collectively referred to as a "subset of data samples 325") from the set of data samples. Each data sample has corresponding feature values for all the features 320 in the set of features. For example, as shown, the working machine 310-1 may select the subset of data samples 325-1, which may include a plurality of data samples 180-1 to 180-N. Then, each working machine 310 may calculate local statistical data of the feature based on the assignment of the feature values of the feature to the respective numerical ranges. For example, the working machine 310-1 may calculate a histogram (that is, the local statistical data) of each feature 320 based on the feature values of the plurality of data samples 180-1 to 180-N with respect to the feature 320, and the size of the histogram is equal to the number of bins (that is, numerical ranges).

Since each working machine 310 only processes the feature values of a part of data samples, the obtained local statistical data may only reflect situations of the part of data. Accordingly, as shown in FIG. 3, each working machine 310 sends the determined local statistical data (for example, the histogram with a size equal to the number of bins) for all the features to the master machine 315. At 330, the master machine 315 aggregates the local statistical data and thereby determines the best split. For example, the best feature and the best threshold feature of the feature are found so that when the set of data samples is allocated to the child nodes according to the best feature and its best threshold feature value, the difference among the data samples reaching the different child nodes is largest. The approach of finding the best split based on the statistical data of the feature values of the individual features is already known in the art and therefore not detailed any more here.

Furthermore, the master machine 315 broadcasts relevant information of the global best split (for example, indicating a global best feature and a global best threshold feature value) to each working machine 310. Each working machine 310 independently determines, based on the global best split, the allocation of the data samples in the corresponding subset of data samples to the child nodes.

It is to be understood that the splitting in the sample-parallel mode introduces certain network communication overhead. For example, in the case that each working machine 310 sends to the master machine 315 the statistical data which is determined for the individual features and represented using the histogram with a size equal to the number of bins, the communication overhead is related to a product of the number (represented as "f") of features and the number of bins (that is, the number of numerical ranges, represented as "b") and therefore represented as O (f*b).

As described above, in addition to the sample-parallel mode, in some embodiments, the node may be split in the feature-parallel mode among the plurality of machines.

Specifically, each machine in the plurality of machines obtains all data samples in the set of data samples. However, each machine only processes the feature values of a part of features in the set of features available for the node splitting. A specific example will be described below with reference to FIG. 4.

Figure 4:
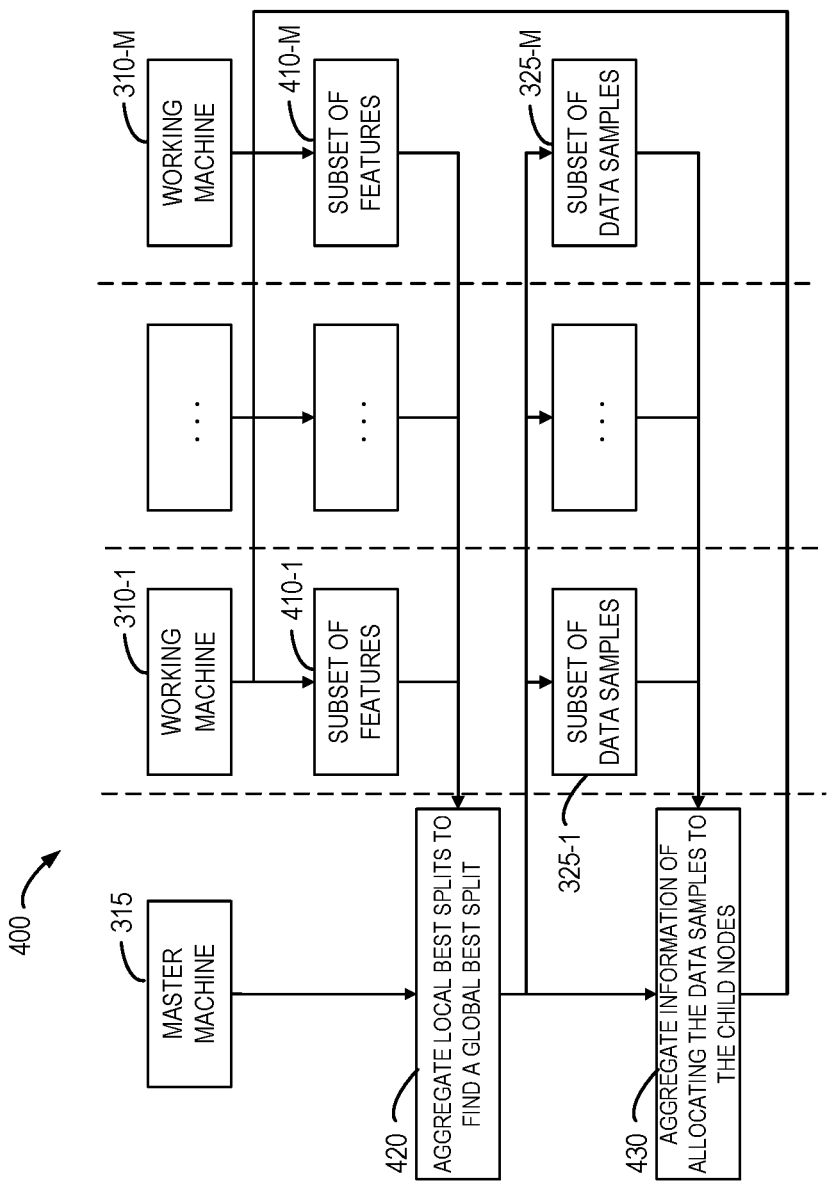
FIG. 4 illustrates an example flow of splitting a node in a feature-parallel mode by a plurality of machines in a system according to some embodiments of the subject matter described herein.

FIG. 4 illustrates an example flow of splitting a node in a feature-parallel mode by a plurality of machines in a system 300 according to some embodiments of the subject matter described herein. As shown, each working machine 310 may select a subset of features 410-1 to 410-M (collectively referred to as a "subset of features 410") from the set of features. Then, each working machine 310 may calculate the statistical data of these features based on the assignment of the feature values of the features in the selected subset of features 410 to the respective numerical ranges. For example, as shown, the working machine 310-1 may select the subset of features 410-1 and calculate the statistical data of each feature 410 in the subset of features 410-1 based on the feature values of all the data samples of the set of data samples for the node with respect to the subset of features 410-1.

Since each working machine 310 processes the feature values of all the data samples, the resulting statistical data of the features have a global sense. Accordingly, each working machine 310 may determine a local best split based on the calculated statistical data. For example, the local best feature and the best threshold feature of the feature are found from the selected subset of features so that the difference between the data samples reaching the different child nodes are largest when the set of data samples are allocated to the respective child nodes according to the local best feature and its best threshold feature value. Then, each working machine 310 may send relevant information of the local best split to the master machine 315, and the information may indicate the local best feature and the corresponding best threshold feature, for example.

At 420, the master machine 315 aggregates the local best splits and determines a global best split. For example, a global best feature is found from all the features so that the difference between the data samples reaching the different child nodes are largest if the set of data samples are allocated to the respective child nodes according to the global best feature and the corresponding best threshold feature value. Since the features is handled separately at the plurality of working machines, only the working machine that has handled the global best feature may determine the allocation of all the data samples in the set of data samples to the respective child nodes. In this case, when the working machine determines the above allocation, other working machines may only stop to wait.

In order to further improve the processing speed and reduce the processing delay, in some embodiments, the allocation of all the data samples to the respective child nodes may be determined by the individual working machines 310 in a sample-parallel mode, rather than by a single machine. For example, as shown in FIG. 4, after the master machine 315 determines the global best split, the master machine 315 may broadcast the global best feature and the corresponding best threshold feature value to all the working machines 310. Each working machine 310 may select a subset of data samples 325 from the set of data samples for the node, and obtain the corresponding feature values of the selected subset of data samples with respect to the global best feature. The global best feature may have been handled or have not yet been handled by the working machine 310. Then, each working machine 310 may allocate the corresponding data samples to the respective child nodes based on comparison of the obtained feature values and the best threshold feature value. Then, each working machine 310 determines information of allocating the data samples to the child nodes and sends the information to the master machine 315.

According to embodiments of the subject matter described herein, the information of allocating a data sample to the corresponding child node may be implemented in any suitable form. As an example, the information of allocating the data sample to the corresponding child node may include an ID of the child node to which the data sample is allocated. When the number of child nodes is smaller than $2^8$, a child node ID of 8 bits (that is, one byte) may be used. When the number of child nodes is smaller than $2^{16}$, a child node ID of 16 bits (that is, two bytes) may be used.

At 430, the master machine 315 aggregates the allocation information received from the individual working machines 310. It is to be understood that the process of determining the allocation of the data samples to the child nodes in this sample-parallel mode will cause network communication overhead, which is related to the number of samples (represented as "s") in the set of data samples and represented as $O(s)$.

In order to further reduce the network communication overhead, in some embodiments, the information of allocating the data sample to the corresponding child node may include information indicating which child node the data sample is allocated to, instead of the child node ID. As an example, in a decision tree implemented, for example, as a binary tree, a single node may be split into two child nodes including a left child node and a right child node. In this example, the working machine 310 in the system 300 may determine whether the data sample is allocated to the left or right child node based on the comparison of the best threshold feature value of the global best feature and the corresponding feature value of the selected subset of data samples. Then, the working machine 310 may use one bit to indicate whether the data sample is allocated to the left or right child node, and include an indicator of one bit in the information of allocating the data sample to the child node.

As an example, "0" may be used to indicate that the data sample is allocated to the left child node, and "1" may be used to indicate that the data sample is allocated to the right child node. In this way, when the number of nodes is smaller than $2^8$, one bit may be used to replace 8 bits to indicate the information of allocating the samples to the nodes. When the number of nodes is smaller than $2^{16}$, one bit may be used to replace 16 bits. Therefore, the system overhead may be significantly reduced.

It is to be understood that the splitting of the node into the left and right child nodes as described above is only for the purpose of illustration with suggesting any limitations. According to embodiments of the subject matter described herein, the node may be split into any number of child nodes, and the number of child nodes may vary with specific applications. When the node is split into other numbers of child nodes except for two child nodes, other numbers of bits may be used to indicate which child node the data sample is allocated to. As an example, two bits may be used to indicate one of four child nodes.

The above approach that the plurality of machines splits the node in the feature-parallel mode allows use of a lot of features during the generation of the decision tree, and thereby further improves the accuracy of fitting the decision tree. Typically, data samples are usually manually labelled by a provider, and the features may be generated through syntactic combinations and sematic embeddings. Accordingly, the increasing speed of the number of samples is far less than that of the number of features. In this case, it is beneficial to use the feature-parallel mode.

In order to further improve the system performance, in some embodiments, the sample-parallel and feature-parallel modes may be combined together among the plurality of machines for the processing of the feature values of the features to further reduce the network communication overhead. As an example, considering that when the feature-parallel mode is employed, the communication overhead $O(s)$ is related to the number s of samples in the set of data samples for the node, the sample-parallel or feature-parallel mode may be selected based on the comparison of the number s of samples and the threshold number (referred to as a "second threshold number").

The second threshold number may be determined based on any suitable rule. Considering that when the sample-parallel mode is employed, the communication overhead $O(f*b)$ is related to a product of the number f of features that may be applied to the set of features of the node and the number b of the numerical ranges, in some embodiments, the second threshold number may be determined based on $f*b$. A specific example will be described below. In this example, the information of allocating the data samples to the respective child nodes may include the child node ID represented with one byte. Furthermore, the statistical data of each numerical range is represented with a triple having three elements, and each element has four bytes. In this case, the second threshold number may be determined as $f*b*12$. Accordingly, if $s<f*b*12$, the feature-parallel mode is selected; otherwise, the sample-parallel mode is selected.

In addition to determining the second threshold number based on $f*b$, in some embodiments, the number (represented as "m") of machines may be taken into account. As described above, when the plurality of working machines 310 split the node in the sample-parallel mode, each working machine 310 sends to the master machine 315 the local statistical data determined for each feature. In this case, the network communication overhead is related to a product of the number f of features, the number b of the numerical ranges and the number m of machines, and represented as $O(f*b*m)$. Accordingly, the second threshold number may be determined based on $f*b*m$.

The example as described above is still considered. That is, the information of allocating the data samples to the corresponding child nodes may include the child node IDs represented with one byte, and the statistical data of each numerical range is represented with a triple having three elements each having four bytes. In this case, the second threshold number may be determined as $f*b*m*12$. Accordingly, if $s<f*b*m*12$, the feature-parallel mode is selected; otherwise, the sample-parallel mode is selected.

As described above, in addition to the sample-parallel and feature-parallel modes, the task-parallel mode may be employed. In order to further improve the processing speed and efficiency, in some embodiments, the task-parallel mode may be combined on the basis of the sample-parallel and feature-parallel modes. For example, when the plurality of machines splits a certain node in the sample-parallel or feature-parallel mode, each of the plurality of machines splits sibling nodes of the node in a parallel mode. When the plurality of machines operate in the task-parallel and sample-parallel modes, each machine transmits the statistical data related to a plurality of sibling nodes. Therefore, at this time, the network communication overhead is related to a product of the number f of features, the number b of the numerical ranges, and the number of machines. Therefore, the second threshold number may be determined based on $f*b*m$.

The second threshold number may be determined by any suitable machine. As an example, the master machine 315 in the system 300 may determine the second threshold number, and notify the working machines 310 of the second threshold number. Alternatively, the determination may be performed by a certain working machine 310 in the system 300.

After the above node splitting is performed, the resulting child nodes after the splitting may be further split to generate the decision tree. According to embodiments of the subject matter described herein, the decision tree may be generated based on any approach of splitting the nodes. In some embodiments, the nodes may be split one by one. For example, a node with a higher splitting gain may be selected to continue the splitting. The splitting gain may indicate a magnitude of difference between the data samples on the child nodes after the splitting. In a decision tree implemented as a binary tree, the splitting gain may be represented as a score derived by subtracting a score of a parent node from a sum of scores of the left and right child nodes. The score of the node is related to the data samples residing on the node. Detailed scoring approaches may vary with the loss functions and the optimization algorithms. Calculation of the score and gain of the splitting is already known in art and not detailed any more here.

In some embodiments, the nodes may also be split one layer by one layer. For example, the allocations of data samples for a plurality of sibling nodes to the respective child nodes may be performed in parallel. This way may substantially improve the processing efficiency and the node splitting speed, thereby improving the efficiency of generating the decision tree. In order to further improve the accuracy of fitting the decision tree, in some embodiments, the splitting of the nodes may be performed for a few more layers (for example, one more layer or two more layers) during the generation of the decision tree. After the stop of the splitting, the obtained leaf node candidates may be merged from bottom to top.

Figure 5:
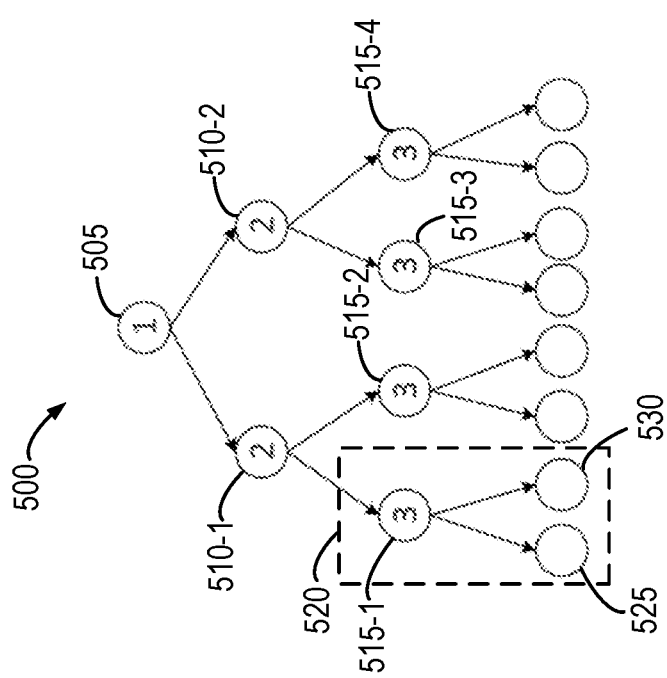
FIG. 5 illustrates an example process of generating a decision tree according to some embodiments of the subject matter described herein.

FIG. 5 illustrates an example process of generating a decision tree 500 according to some embodiments of the subject matter described herein. As shown, the splitting of the nodes is performed one layer by one layer from a root node 505. In an individual layer of the decision tree 500, all nodes 510-1 and 510-2 (or nodes 515-1, 515-2 and 515-3) of the layer are split in parallel. The splitting operation is continued until the number of the obtained leaf node candidates is greater than a predetermined threshold number (referred to as a "third threshold number").

Then, a bottom-layer sub-tree 520 of the decision tree 500 may be obtained. The bottom-layer sub-tree includes a parent node 515-1 and the leaf node candidates 525 and 530 generated by splitting the parent node 515-1. Next, a difference between the data samples for the leaf node candidates 525 and 530 in the bottom-layer sub-tree 520 is determined. If the difference is lower than the threshold difference, the leaf node candidates 525 and 530 in the bottom-layer sub-tree 520 may be removed, and thereby only the parent node 515-1 is retained.

In an embodiment, an example flow of a merging algorithm of the leaf node candidates is presented as follows:

```
Input:      A complete tree T with 2^d leaf nodes.
Output:     A pruned tree with l leaf nodes.
procedure:  BOTTOMUPGREEDYMERGE
            for each leaf candidate in leaves of T do
                parent = getParent (leaf)
                sibling = getSibling (leaf)
                if sibling is a leaf then
                    BST Set.AddBST (leaf, sibling, parent)
            steps = 2^d −1
            while steps > 0 do
                min = 0, target = null
                for each bst ∈ BST Set do
                    (left, right, parent) = getNodes (bst)
                    if min > score_left + score_right − score_parent then
                        min = score_left + score_right − score_parent
                        target = bst
                (left, right, parent) = getNodes (target)
                remove left and right
                mark parent as a leaf node
                root = getRoot (parent)
                sibling = getSibling (parent)
                if sibling is a leaf then
                    BST Set.AddBST (parent, sibling, root)
                steps- = 1
```

Figure 6:
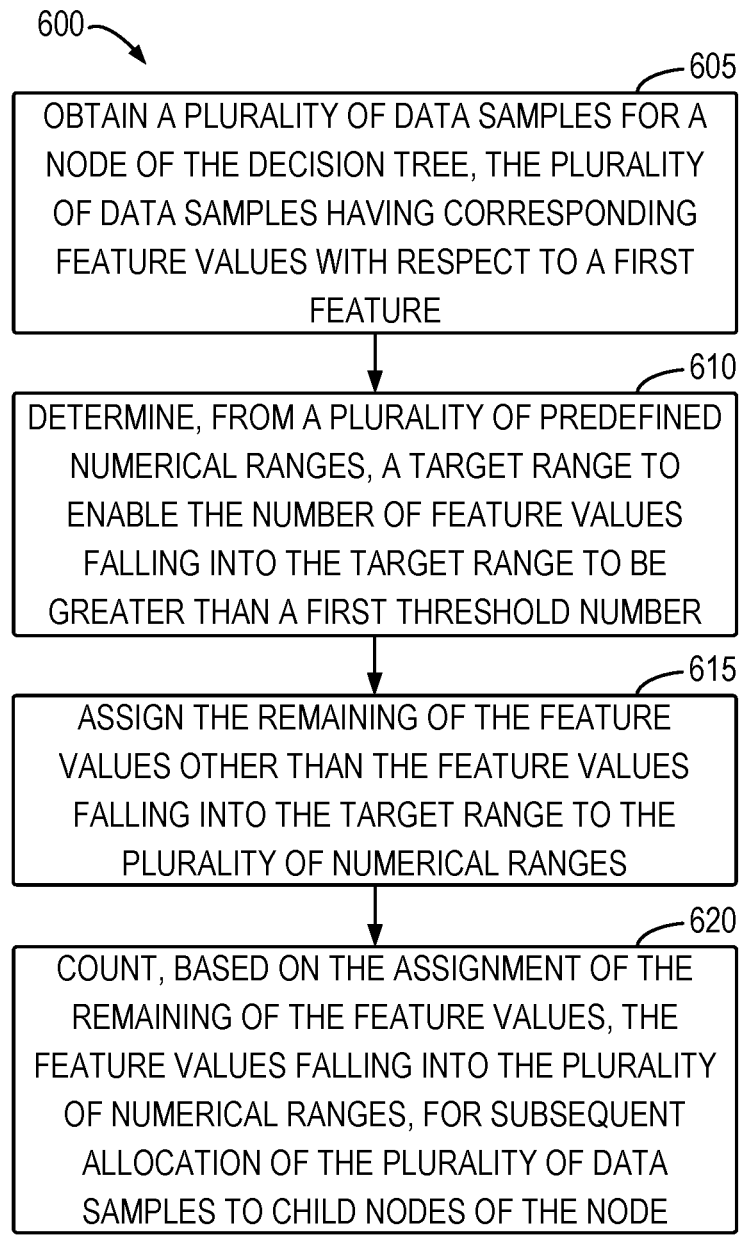
FIG. 6 illustrates a flow chart of a method according to some embodiments of the subject matter described herein.

FIG. 6 illustrates a flow chart of a method 600 according to some embodiments of the subject matter described herein. As shown, at 605, a plurality of data samples having features are obtained, and these data samples have corresponding feature values with respect to the feature. At 610, a target range is determined from a plurality of predefined numerical ranges, and the number of a set of feature values falling into the target range is greater than the first threshold number. At 615, the feature values except for the set of feature values are assigned to the respective numerical ranges. At 620, the data samples are split based on the assignment of the feature values to the numerical ranges. It is noted that features described above with reference to FIGS. 1 to 5 all apply to the method 600 and will not be detailed any more here.

The functions depicted herein may be at least in part executed by one or more hardware logic components. For example, schematic types of hardware logic components available include, but are not limited to, a field programmable gate array (FPGA), an application-specific integrated circuit (ASIC), an application-specific standard product (ASSP), a system on chip (SOC), a complex programmable logic device (CPLD), and the like.

The program codes for implementing the method of the subject matter described herein may be compiled using any combination of one or more programming languages. These computer program codes may be provided to a processor or controller of a general computer, a specific computer or other programmable data processing device, such that the program codes, when being executed by the processor or controller, cause the functions/operations prescribed in the flow diagrams and/or block diagrams to be implemented. The program code may be executed completely or in part on the machine, or in part executed on the machine as an independent software packet and in part executed on the remote machine, or completely executed on the remote machine or server.

In the context of the subject matter described herein, the machine-readable medium may be a tangible medium, which may include or store programs used by an instruction executing system, apparatus or device or used in conjunction with the instruction executing system, apparatus or device. The machine-readable medium may be machine-readable signal or storage medium. The machine-readable medium may include, but be not limited to, an electronic, magnetic, optical, electromagnetic, infrared, or semiconductor system, apparatus or device, or any suitable combination of the above. More specific examples of the machine-readable storage medium will include electric connection based on one or more lines, a portable computer disk, a hard disk, a random access memory (RAM), a read-only memory (ROM), an electrically erasable programmable read-only memory (EEPROM or flash memory), an optical fiber, a compact disk read-only memory (CD-ROM), an optical storage device, a magnetic memory device, or any suitable combination of the above.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any disclosure or of what may be claimed, but rather as descriptions of features that may be specific to particular implementations of particular disclosures. Certain features that are described in this specification in the context of separate implementations may also be implemented in combination in a single implementation. Conversely, various features that are described in the context of a single implementation may also be implemented in multiple implementations separately or in any suitable sub-combination.

Hereinafter, some example implementations of the subject matter described herein will be listed.

In one aspect, there is provided a computer-implemented method. The method comprises: obtaining a plurality of data samples for a node of a decision tree, the plurality of data samples having corresponding feature values with respect to a first feature; determining, from a plurality of predefined numerical ranges, a target range to enable the number of feature values falling into the target range to be greater than a first threshold number; assigning the remaining of the feature values other than the feature values falling into the target range to the plurality of numerical ranges; and counting, based on the assignment of the remaining of the feature values, the feature values falling into the plurality of numerical ranges, for allocation of the plurality of data samples to child nodes of the node.

In some embodiments, counting the feature values comprises: subtracting, by the number of feature values falling into the remaining of the numerical ranges other than the target range, the total number of the plurality of data samples, as the number of feature values falling into the target range.

In some embodiments, data processing is performed in distribution on a plurality of machines, and obtaining the plurality of data samples comprises: determining, at a machine of the plurality of machines, whether the number of samples in a set of data samples for the node is below a second threshold number; and in response to the number of samples being below the second threshold number, selecting all data samples in the set of data samples as the plurality of data samples.

In some embodiments, the first feature is selected from a set of features, and the second threshold number is determined at least in part based on a first product of the number of features in the set of features and the number of the plurality of numerical ranges.

In some embodiments, the second threshold number is further determined at least in part based on a second product of the number of the plurality of machines and the first product.

In some embodiments, the child nodes includes at least a left child node and a right child node, and the method further comprises: obtaining, at the machine of the plurality of machines, a second feature and a threshold feature value of the second feature; selecting a subset of data samples from the set of data samples; and for each data sample in the subset of data samples: comparing the feature value of the data sample with respect to the second feature with the threshold feature value, determining, based on the comparison, whether the data sample is allocated to the left or right child node, and sending, to a further machine of the plurality of machines, an indicator of one bit for indicating the determination.

In some embodiments, obtaining the plurality of data samples further comprises: in response to the number of samples being greater than the second threshold number, selecting, at the machine of the plurality of machines, a subset of the set of data samples as the plurality of data samples.

In some embodiments, the method further comprises: allocating, based on the counting of the feature values, the data samples from the node to the child nodes; determining whether a plurality of leaf node candidates of the decision tree have been obtained, the number of the plurality of leaf node candidates being greater than a third threshold number; in response to determining that the plurality of leaf node candidates have been obtained, obtaining a bottom-layer sub-tree of the decision tree, the bottom-layer sub-tree including the leaf node candidates having a common parent node and the parent node; and in response to differences between the data samples for the leaf node candidates in the bottom-layer sub-tree being below a threshold difference, removing the leaf node candidates in the bottom-layer sub-tree.

In some embodiments, the node has a sibling node, and allocating the data samples from the node to the child nodes further comprises: allocating the data samples from the node to the child nodes in parallel with allocating data samples for the sibling node to child nodes of the sibling node.

In some embodiments, there is provided an apparatus. The apparatus comprises: a processing unit; and a memory coupled to the processing unit and configured to store instructions which, when executed by the processing unit, perform data processing based on a decision tree, comprising actions: obtaining a plurality of data samples for a node of the decision tree, the plurality of data samples having corresponding feature values with respect to a first feature; determining, from a plurality of predefined numerical ranges, a target range to enable the number of feature values falling into the target range to be greater than a first threshold number; assigning the remaining of the feature values other than the feature values falling into the target range to the plurality of numerical ranges; and counting, based on the assignment of the remaining of the feature values, the feature values falling into the plurality of numerical ranges, for allocation of the plurality of data samples to child nodes of the node.

In some embodiments, counting the feature values comprises: subtracting, by the number of feature values falling into the remaining of the numerical ranges other than the target range, the total number of the plurality of data samples, as the number of feature values falling into the target range.

In some embodiments, the data processing is performed in distribution on a plurality of machines, and obtaining the plurality of data samples comprises: determining, at a machine of the plurality of machines, whether the number of samples in a set of data samples for the node is below a second threshold number; and in response to the number of samples being below the second threshold number, selecting all data samples in the set of data samples as the plurality of data samples.

In some embodiments, the first feature is selected from a set of features, and the second threshold number is determined at least in part based on a first product of the number of features in the set of features and the number of the plurality of numerical ranges.

In some embodiments, the second threshold number is further determined at least in part based on a second product of the number of the plurality of machines and the first product.

In some embodiments, the child nodes include at least a left child node and a right child node, and the actions further comprise: obtaining, at the machine of the plurality of machines, a second feature and a threshold feature value of the second feature; selecting a subset of data samples from the set of data samples; and for each data sample in the subset of data samples: comparing the feature value of the data sample with respect to the second feature with the threshold feature value, determining, based on the comparison, whether the data sample is allocated to the left or right child node, and sending, to a further machine of the plurality of machines, an indicator of one bit for indicating the determination.

In some embodiments, obtaining the plurality of data samples further comprises: in response to the number of samples being greater than the second threshold number, selecting, at the machine of the plurality of machines, a subset of the set of data samples as the plurality of data samples.

In some embodiments, the actions further comprise: allocating, based on the counting of the feature values, the data samples from the node to the child nodes; determining whether a plurality of leaf node candidates of the decision tree have been obtained, the number of the plurality of leaf node candidates being greater than a third threshold number; in response to determining that the plurality of leaf node candidates have been obtained, obtaining a bottom-layer sub-tree of the decision tree, the bottom-layer sub-tree including the leaf node candidates having a common parent node and the parent node; and in response to differences between data samples for the leaf node candidates in the bottom-layer sub-tree being below a threshold difference, removing the leaf node candidates in the bottom-layer sub-tree.

In some embodiments, the node has a sibling node, and allocating the data samples from the node to the child nodes further comprises: allocating the data samples from the node to the child nodes in parallel with allocating data samples for the sibling node to child nodes of the sibling node.

In some embodiments, there is provided a computer program product. The computer program product is stored in a non-transient computer storage medium and includes machine executable instructions which, when running in a device, cause the device to perform data processing based on a decision tree, comprising actions: obtaining a plurality of data samples for a node of the decision tree, the plurality of data samples having corresponding feature values with respect to a first feature; determining, from a plurality of predefined numerical ranges, a target range to enable the number of feature values falling into the target range to be greater than a first threshold number; assigning the remaining of the feature values other than the feature values falling into the target range to the plurality of numerical ranges; and counting, based on the assignment of the remaining of the feature values, the feature values falling into the plurality of numerical ranges, for allocation of the plurality of data samples to child nodes of the node.

In some embodiments, counting the feature values comprises: subtracting, by the number of feature values falling into the remaining of the numerical ranges other than the target range, the total number of the plurality of data samples, as the number of feature values falling into the target range.

In some embodiments, the data processing is performed in distribution on a plurality of machines, and obtaining the plurality of data samples comprises: determining, at a machine of the plurality of machines, whether the number of samples in a set of data samples for the node is below a second threshold number; and in response to the number of samples being lower than the second threshold number, selecting all data samples in the set of data samples as the plurality of data samples.

In some embodiments, the first feature is selected from a set of features, and the second threshold number is determined at least in part based on a first product of the number of features in the set of features and the number of the plurality of numerical ranges.

In some embodiments, the second threshold number is further determined at least in part based on a second product of the number of the plurality of machines and the first product.

In some embodiments, the child nodes include at least a left child node and a right child node, and the actions further comprise: obtaining, at the machine of the plurality of machines, a second feature and a threshold feature value of the second feature; selecting a subset of data samples from the set of data samples; and for each data sample in the subset of data samples: comparing the feature value of the data sample with respect to the second feature with the threshold feature value, determining, based on the comparison, whether the data sample is allocated to the left or right child node, and sending, to a further machine of the plurality of machines, an indicator of one bit for indicating the determination.

In some embodiments, obtaining the plurality of data samples further comprises: in response to the number of samples being greater than the second threshold number, selecting, at the machine of the plurality of machines, a subset of the set of data samples as the plurality of data samples.

In some embodiments, the actions further comprise: allocating, based on the counting of the feature values, the data samples from the node to the child nodes; determining whether a plurality of leaf node candidates of the decision tree have been obtained, the number of the plurality of leaf node candidates being greater than a third threshold number; in response to determining that the plurality of leaf node candidates have been obtained, obtaining a bottom-layer sub-tree of the decision tree, the bottom-layer sub-tree including the leaf node candidates having a common parent node and the parent node; and in response to differences between data samples for the leaf node candidates in the bottom-layer sub-tree being below a threshold difference, removing the leaf node candidates in the bottom-layer sub-tree.

In some embodiments, the node has a sibling node, and allocating the data samples from the node to the child nodes further comprises: allocating the data samples from the node to the child nodes in parallel with allocating data samples for the sibling node to child nodes of the sibling node.

Although the subject matter described herein has been described using languages specific to the structural features and/or method logic actions, it is to be understood that the subject matter as limited in the appended claims is not necessarily limited to the specific features or actions described above. On the contrary, the specific features and actions described above are only example implementations of the claims.

The invention claimed is:

1. A method of data processing based on a decision tree, comprising:
   determining that a number of samples in a set of data samples for a node of the decision tree is below a first threshold number;
   selecting all data samples in the set of data samples as a plurality of data samples, the plurality of data samples having corresponding feature values with respect to a first feature;
   determining, from a plurality of numerical ranges, a target range, with a number of feature values falling into the target range being greater than a second threshold number;
   assigning the remaining of the feature values, other than the feature values falling into the target range, to the plurality of numerical ranges; and
   counting, based on the assignment of the remaining of the feature values, the feature values falling into the plurality of numerical ranges, for allocation of the plurality of data samples to child nodes of the node.

2. The method according to claim 1, wherein counting the feature values comprises:
   subtracting, by the number of feature values falling into the remaining of the numerical ranges other than the target range, from a total number of the plurality of data samples, as the number of feature values falling into the target range.

3. The method according to claim 1, wherein the data processing is performed in distribution on a plurality of machines, the first threshold number being determined at least in part based on a first product of a number of features in the set of features and a number of the plurality of numerical ranges.

4. The method according to claim 3, wherein the first threshold number is further determined at least in part based on a second product of a number of the plurality of machines and the first product.

5. The method according to claim 3, wherein the child nodes include at least a left child node and a right child node, and the method further comprises:
   obtaining, at a first machine of the plurality of machines, a second feature and a threshold feature value of the second feature;
   selecting a subset of data samples from the set of data samples; and
   for each data sample in the subset of data samples,
      comparing a feature value of the data sample with respect to the second feature with the threshold feature value,
      determining, based on the comparison, whether the data sample is allocated to the left child node or the right child node, and sending, to a second machine of the plurality of machines, an indicator of one bit for indicating the determination.

6. The method according to claim 3, further comprising:
in response to the number of samples being greater than the first threshold number, selecting, at the first machine of the plurality of machines, a subset of the set of data samples as the plurality of data samples.

7. The method according to claim 1, further comprising:
allocating, based on the counting of the feature values, the data samples from the node to the child nodes;
determining whether a plurality of leaf node candidates of the decision tree have been obtained, a number of the plurality of leaf node candidates being greater than a third threshold number;
in response to determining that the plurality of leaf node candidates have been obtained, obtaining a bottom-layer sub-tree of the decision tree, the bottom-layer sub-tree including the leaf node candidates having a common parent node and the parent node; and
in response to differences between data samples for at least one of the plurality of leaf node candidates in the bottom-layer sub-tree being below a threshold difference, removing the at least one of the plurality of leaf node candidates in the bottom-layer sub-tree.

8. The method according to claim 1, wherein a feature value refers to a value indicating relevance between a data sample and a feature.

9. The method according to claim 1, wherein the feature values are stored in storage areas allocated to respective ones of the plurality of numerical ranges with the feature values falling into the target range not being stored.

10. An electronic device, comprising:
a processing unit; and
a memory coupled to the processing unit and storing instructions, which, when executed by the processing unit, perform data processing based on a decision tree, comprising actions:
determining that a number of samples in a set of data samples for a node of the decision tree is below a first threshold number;
selecting all data samples in the set of data samples as a plurality of data samples, the plurality of data samples having corresponding feature values with respect to a first feature;
determining, from a plurality of numerical ranges, a target range, with a number of feature values falling into the target range being greater than a second threshold number;
assigning the remaining of the feature values, other than the feature values falling into the target range, to the plurality of numerical ranges; and
counting, based on the assignment of the remaining of the feature values, the feature values falling into the plurality of numerical ranges, for allocation of the plurality of data samples to child nodes of the node.

11. The device according to claim 10, wherein the data processing is performed in distribution on a plurality of machines,
the second first threshold number being determined at least in part based on a first product of a number of features in the set of features and a number of the plurality of numerical ranges.

12. The device according to claim 11, wherein the first threshold number is further determined at least in part based on a second product of a number of the plurality of machines and the first product.

13. The device according to claim 11, wherein the child nodes include at least a left child node and a right child node, and the actions further comprise:
obtaining, at a first machine of the plurality of machines, a second feature and a threshold feature value of the second feature;
selecting a subset of data samples from the set of data samples; and
for each data sample in the subset of data samples,
comparing a feature value of the data sample with respect to the second feature with the threshold feature value,
determining, based on the comparison, whether the data sample is allocated to the left child node or the right child node, and
sending, to a second machine of the plurality of machines, an indicator of one bit for indicating the determination.

14. The device according to claim 11, wherein the actions further comprise:
in response to the number of samples being greater than the first threshold number, selecting a subset of the set of data samples as the plurality of data samples.

15. The device according to claim 10, wherein the actions further comprise:
allocating, based on the counting of the feature values, the data samples from the node to the child nodes;
determining whether a plurality of leaf node candidates of the decision tree have been obtained, a number of the plurality of leaf node candidates being greater than a third threshold number;
in response to determining that the plurality of leaf node candidates have been obtained, obtaining a bottom-layer sub-tree of the decision tree, the bottom-layer sub-tree including the leaf node candidates having a common parent node and the parent node; and
in response to differences between data samples for at least one of the plurality of leaf node candidates in the bottom-layer sub-tree being below a threshold difference, removing the at least one of the plurality of leaf node candidates in the bottom-layer sub-tree.

16. The device according to claim 10, wherein counting the feature values comprises:
subtracting, by the number of feature values falling into the remaining of the numerical ranges other than the target range, from a total number of the plurality of data samples, as the number of feature values falling into the target range.

17. A computer program product stored in a non-transient computer storage medium and including machine executable instructions which, when running in a device, cause the device to perform data processing based on a decision tree, comprising actions:
determining that a number of samples in a set of data samples for a node of the decision tree is below a first threshold number;
selecting all data samples in the set of data samples as a plurality of data samples, the plurality of data samples having corresponding feature values with respect to a first feature;
determining, from a plurality of numerical ranges, a target range, with a number of feature values falling into the target range being greater than a second threshold number;
assigning the remaining of the feature values, other than the feature values falling into the target range, to the plurality of numerical ranges; and counting, based on the assignment of the remaining of the feature values, the feature values falling into the plurality of numerical ranges, for allocation of the plurality of data samples to child nodes of the node.

18. The computer program product according to claim 17, wherein the data processing is performed in distribution on a plurality of machines, the first threshold number being determined at least in part based on a first product of the number of features in the set of features and a number of the plurality of numerical ranges.

19. The computer program product according to claim 18, wherein the child nodes include at least a left child node and a right child node, and the actions further comprising:

obtaining, at a first machine of the plurality of machines, a second feature and a threshold feature value of the second feature;

selecting a subset of data samples from the set of data samples; and for each data sample in the subset of data samples, comparing a feature value of the data sample with respect to the second feature with the threshold feature value, determining, based on the comparison, whether the data sample is allocated to the left child node or the right child node, and sending, to a second machine of the plurality of machines, an indicator of one bit for indicating the determination.

20. The computer program product according to claim 17, wherein the actions further comprise:

predicting relevance of document candidates using the decision tree in a machine learning model associated with a web searching application.

* * * * *